United States Patent [19]
Meyer

[11] Patent Number: 5,864,223
[45] Date of Patent: *Jan. 26, 1999

[54] BATTERY LIFE EXTENDER APPARATUS

[76] Inventor: Dennis R. Meyer, 17830 2nd Ave., Plymouth, Minn. 55447

[*] Notice: This patent issued on a continued prosecution application filed under 37 CFR 1.53(d), and is subject to the twenty year patent term provisions of 35 U.S.C. 154(a)(2).

[21] Appl. No.: 743,199

[22] Filed: Nov. 5, 1996

[51] Int. Cl.[6] .................................................. H02J 7/00
[52] U.S. Cl. ........................................ 370/137; 370/163
[58] Field of Search .................................. 320/4, 30, 39, 320/2, 160, 111, 162, 137, 163, 145; 336/83, 120

[56] References Cited

U.S. PATENT DOCUMENTS

| | | | |
|---|---|---|---|
| 3,348,181 | 10/1967 | Stromswold | 336/120 |
| 3,568,031 | 3/1971 | Eberts | 320/5 |
| 3,763,327 | 10/1973 | Hescher | 360/108 |
| 3,870,855 | 3/1975 | Edlund et al. | 219/202 |
| 3,898,547 | 8/1975 | Poole | 320/2 |
| 4,009,051 | 2/1977 | Kaziis et al. | 320/102 |
| 4,310,793 | 1/1982 | Sheldrake et al. | 322/28 |
| 4,536,697 | 8/1985 | Johnston et al. | 322/14 |
| 4,663,580 | 5/1987 | Wortman | 320/35 |
| 4,931,367 | 6/1990 | Brecht et al. | 429/50 |
| 4,935,688 | 6/1990 | Mistry et al. | 320/4 |
| 5,017,856 | 5/1991 | Johnson, Jr. | 320/2 |
| 5,084,664 | 1/1992 | Gali | 320/61 |
| 5,179,335 | 1/1993 | Nor | 320/21 |
| 5,272,431 | 12/1993 | Nee | 320/2 |
| 5,276,393 | 1/1994 | Gali | 320/21 |
| 5,319,298 | 6/1994 | Wanzong et al. | 320/22 |
| 5,352,966 | 10/1994 | Irons | 320/3 |
| 5,506,560 | 4/1996 | Takeuchi et al. | 336/83 |
| 5,523,667 | 6/1996 | Feldstein | 320/3 |
| 5,629,604 | 5/1997 | Sengupta et al. | 320/145 |
| 5,635,814 | 6/1997 | Afzal et al. | 320/111 |
| 5,708,348 | 1/1998 | Frey et al. | 320/145 |

OTHER PUBLICATIONS

Smith, "The Affect of Weather on Your Batteries" and TechTalk Q & A, *PulseTalk,* Spring, 1996, pp. 1–2.

"Product Spotlight—New Technology Extends the Life of Your RV Battery", *Wester RV News,* Jan. 1996, p. 17.

*Primary Examiner*—Peter S. Wong
*Assistant Examiner*—Gregory J. Toatley, Jr.
*Attorney, Agent, or Firm*—Dicke, Billig & Czafa, P.A.

[57] ABSTRACT

Apparatus for extending the battery life of a seasonal-use battery. The apparatus is an improvement in a seasonal-use device having a battery charging system, wherein the battery charging system includes a voltage step-down device coupled to the charging system. The improvement includes a mechanism integral the battery charging system for providing a maintenance current to the battery proximate the battery's self-discharge rate. A mechanism is provided for coupling the battery charging system to an external power source. The apparatus for extending the battery life may also be coupled to the seasonal-use device system controller.

18 Claims, 7 Drawing Sheets

BATTERY LIFE EXTENDER APPARATUS

FIELD OF THE INVENTION

The present invention relates generally to a battery charging system. In particular, the present invention relates to an apparatus for extending the life of a battery used in a seasonal-use device by providing a maintenance current to the battery approximately equal to the battery's self-discharge rate and thereby greatly reducing plate sulfation. The apparatus may be integrated into the seasonal-use device diagnostic, control and charging system.

BACKGROUND OF THE INVENTION

Seasonal-use devices include recreational vehicles and seasonal equipment, such as lawn mowers, yard tractors, personal watercraft, boats, motorcycles, snowmobiles, construction and agricultural equipment. Seasonal-use devices utilize batteries as an electric power source to provide electric start and control power to the device. During operation of the seasonal-use device, the internal battery charging system maintains the charge on the battery.

Because these devices are only used seasonally, the battery is normally stored for a number of months, which results in self-discharging of the battery. Internally, the battery is undergoing a process called plate sulfation, which creates an insulating coating on the plates preventing subsequent full performance from the battery. Once plate sulfation has occurred, even if the battery is fully charged, it will no longer operate at optimum efficiency and full battery capacity.

The type of battery most commonly used in seasonal-use vehicles is a lead-acid battery. Typically, lead-acid batteries will self-discharge at an approximate rate of 1 percent per day, yielding a battery which is approximately 80 percent discharged after just six months. The discharge condition of the battery causes the battery's plates to sulfate, resulting in a shortened battery life. It has been found that batteries allowed to self-discharge for six month periods usually have a life of about two years or about ⅓ the normal life expectancy and then must be replaced.

Diesel engines are popular since diesel engines can extract up to 50 percent greater energy from the same cost of fuel as compared to gasoline engines. Due to the high compression ratios of the diesel engines, they require very large battery packs for starting. These large battery packs are very costly, making it important to extend the battery life as long as possible.

Known battery charging system devices and methods include such apparatus disclosed in U.S. Pat. No. 3,568,031 to Eberts (Vehicle Power Supply for Battery Charging and Load Supply); U.S. Pat. No. 3,870,855 to Edlund et al. (Electric Heating and Battery Charging System for Motor Vehicle); U.S. Pat. No. 3,898,547 to Poole (Electric Vehicle Charger Shut-Off Interlock System); U.S. Pat. No. 5,017,856 to Johnson, Jr. (Battery Charging System); and U.S. Pat. No. 5,272,431 to Nee (Automatic Power Connector for Recharging Electric Vehicles).

U.S. Pat. No. 4,935,688 to Mystry et al. suggest that over time, the common lead-acid battery cell corrodes at the positive cell electrode due to the oxidizing conditions resulting from the repeated application of charging current to the cell. Mystry et al. '688 suggests minimizing the oxidization of the plates of electrolytic battery cells during flow charge by the application of a small additional current.

Other known mechanisms include "Off-Season Automatic Battery Maintainers" which suggest a wall-mount mechanism for maintaining full charge in a battery during long storage periods. The battery maintainer is wall mounted and plugs into a 120 volt outlet. Battery clamps are provided for coupling the maintainer to the vehicle battery. The battery maintainer provides a ½ amp to 1 amp charge as needed to the battery.

The disadvantage of present off-the-shelf battery maintainers is that they are not application specific. They have a preset maintenance current, which may result in maintaining small motorcycle batteries at far too high a current level, thereby destroying the motorcycle battery in a single off season. Likewise, the same battery maintainer may be unable to maintain large battery packs found in large agricultural tractors, resulting in discharge and battery sulfation. Further, no monitoring and control is built into the battery maintainers to prevent the above-stated problems from occurring.

Due to the high replacement cost of batteries and the environmental sensitivity to lead-based and other types of batteries, it is desirable to extend the life of these batteries. It is desirable to have an apparatus for providing a seasonal-use battery with a small amount of current equal to the battery's self-discharge current during storage, extending the battery life and preventing battery sulfation. Further, it is desirable to provide a battery life extender and control apparatus which is integrated into the existing battery charging system of the seasonal-use device, including the seasonal-use device control and display system, and which is application specific.

SUMMARY OF THE INVENTION

The present invention is an apparatus for extending the life of a battery used in a seasonal-use or periodic use device by providing a maintenance current to the battery approximately equal to the battery self-discharge rate, and thereby preventing plate sulfation. The apparatus is integrated into the seasonal-use device battery charging system. The apparatus may also be integrated into the seasonal-use device control diagnostic system. The apparatus, in accordance with the present invention, provides an economically feasible method of extending battery life.

In one embodiment, the present invention is an improvement to a seasonal-use device having a battery charging system, including a transformer coupled to an alternator system. The improvement includes a mechanism integral the battery charging system for providing a maintenance current to the battery approximately equal to the battery self-discharge rate. A mechanism is provided for coupling the battery charging system to an external power source.

The transformer of the battery charging system may include a secondary winding coupled to a secondary transformer core. The mechanism for providing a maintenance current coupled to the secondary transformer core may include a primary winding. The primary winding may be coupled to the mechanism for coupling the battery charging system to the external power source.

In one embodiment, the mechanism for coupling is a power cord, and the external power source is a conventional outlet coupled to a 120 volt power system. It is also recognized that the present invention may be coupled to other power sources, such as a 240 volt power source.

The present invention may include a primary transformer core extension. The primary winding may be coupled about the primary transformer core extension. A mechanism may be provided for coupling the primary transformer core extension to the secondary transformer core.

The present invention may be integrated into the seasonal-use device system controller. A battery sensor may be coupled to the system controller, having an output signal representative of a sensed battery diagnostic characteristic.

One preferred embodiment of the present invention integrates the battery life extender apparatus and associated maintenance current generation into the seasonal use device closed loop monitoring, display, control and charging system utilizing such existing functions on modern seasonal use devices.

BRIEF DESCRIPTION OF THE DRAWINGS

The invention will be further described with reference to accompanying drawings where like numbers refer to like parts in several views, and wherein.

DETAILED DESCRIPTION OF THE PREFERRED EMBODIMENTS

The present invention is an apparatus for extending the life of a battery used in a seasonal-use or periodic use device by providing a maintenance current to the battery approximately equal to the battery self-discharge rate, and thereby preventing plate sulfation. The apparatus may be integrated into the seasonal-use device battery charging system and control diagnostic system, providing an economically feasible method of extending battery life. Although the specification refers to extending the battery of a seasonal use device, it is recognized that the present invention may be used with other types of devices, such as a periodic use device.

Although the present invention described herein is for use with a seasonal-use device, such as a snowmobile, personal watercraft, or other seasonal-use device, it is recognized that the present invention may be used to extend the battery life of any seasonal-use or periodic use battery. Known seasonal-use devices in which the present invention may be used to extend battery life include construction equipment, agricultural equipment, lawn and garden equipment, all terrain vehicles, mopeds, motorscooters, motorcycles, boats, personal watercraft, trolling motors, snowmobiles, motorhomes, travel trailers, private aircraft, and other seasonal-use devices.

It is recognized that the present invention may be used to extend the life of any seasonal-use battery, such as lead-acid batteries, and similar battery systems. The battery life extender apparatus will keep all types of batteries in a fully charged "ready" condition. At the end of the off season, when the seasonal use device is taken out of storage, the battery is fully charged and ready to go, instead of being in a discharged state.

Figure 1:
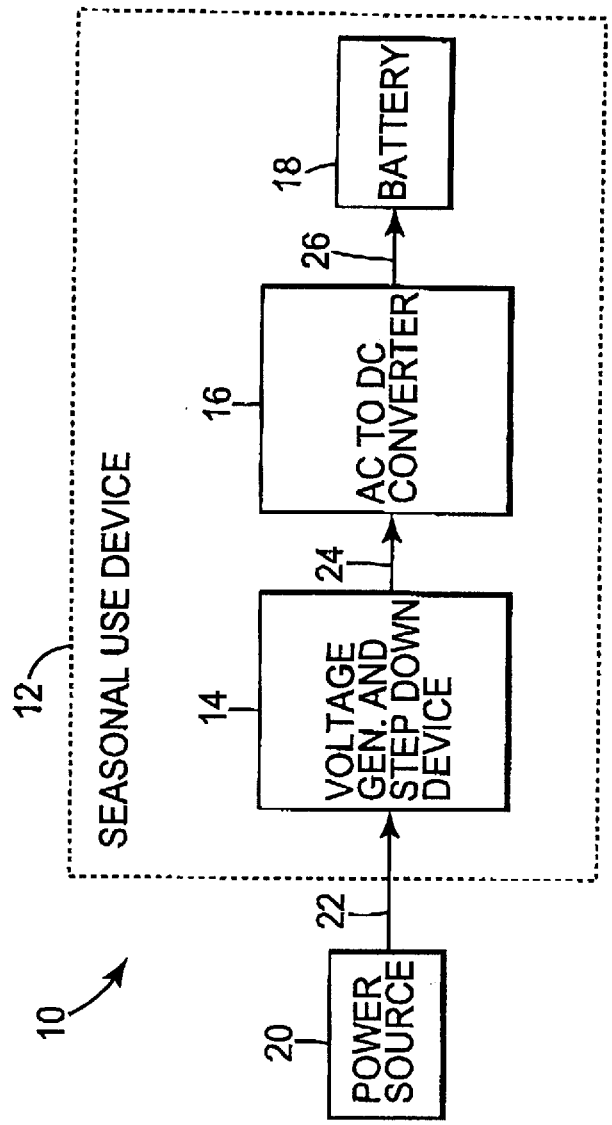
FIG. 1 is a schematic block diagram of a battery life extender system in accordance with the present invention.

FIG. 1 shows a battery life extender apparatus in accordance with the present invention generally at 10. The battery life extender apparatus 10 is for use with a seasonal-use device 12. The battery life extender apparatus 10 is located integral the seasonal-use device 12, and may utilize a portion of the existing seasonal-use device 12 battery charging system.

The battery life extender apparatus 10 generally includes a voltage step-down device 14, an AC-to-DC converter 16, and a seasonal-use device battery 18. The voltage step-down device 14 may be releasably coupled to an external power source 20, indicated at 22. Voltage step-down device 14 is electrically coupled to AC-to-DC converter 16, indicated at 24. The AC-to-DC converter 16 is electrically coupled to battery 18, indicated at 26.

The battery life extender apparatus 10 utilizes a major portion of the seasonal-use device 12 battery charging system for off-season maintenance of the battery 18. Power source 20 is utilized to provide power for supplying a small current to battery 18, which is equal to the battery 18 self-discharge current during storage. For example, a typical lead-acid battery will self-discharge about 1 percent per day yielding a battery which is approximately 80 percent discharged after 6 months, causing the battery plates to sulfate, resulting in a shortened battery life. The present invention provides the battery with a small current equal to the battery's self-discharge current during storage. The value of the self-discharge current is unique to each battery type and size. Testing has found that for a conventional lead-acid battery, the required maintenance current preferable range is 0.4 milliamp to 1.6 milliamp per amp hour battery rating. In one preferred embodiment, the maintenance current is 1 milliamp per amp hour battery rating.

The following table shows sample battery self-discharge currents for known seasonal use devices for a 12 volt DC battery at 25° C.:

TABLE 1

| Device or Vehicle | Battery Size in Ampere Hours | Battery Self-Discharge Current | Estimated Maximum Maintenance Current |
|---|---|---|---|
| Moped | 6 AH | 2.5 mA | 10 mA |
| Motorcycle | 12 AH | 5 mA | 20 mA |
| Riding Lawn Mower | 25 AH | 10 mA | 40 mA |
| Garden Tractor | 40 AH | 17 mA | 68 mA |
| Mid-Size Auto | 65 AH | 27 mA | 108 mA |
| Mid-Size Truck | 100 AH | 42 mA | 168 mA |
| Large Ag. Tractor | 240 AH | 100 mA | 400 mA |

The battery self-discharge rate varies with storage temperature. Batteries will self-discharge at a higher rate when stored in a warm environment, and will discharge at a slower rate when stored in a cold environment when initially fully charged.

The unique battery life extender apparatus 10 in accordance with the present invention is integrated into the existing charging circuit of the seasonal-use device, resulting in a simple and economic method of extending battery life for seasonal-use devices. The battery life extender apparatus 10 is very economically feasible, since it utilizes a portion of the seasonal-use device's existing battery charging system.

Figure 2:
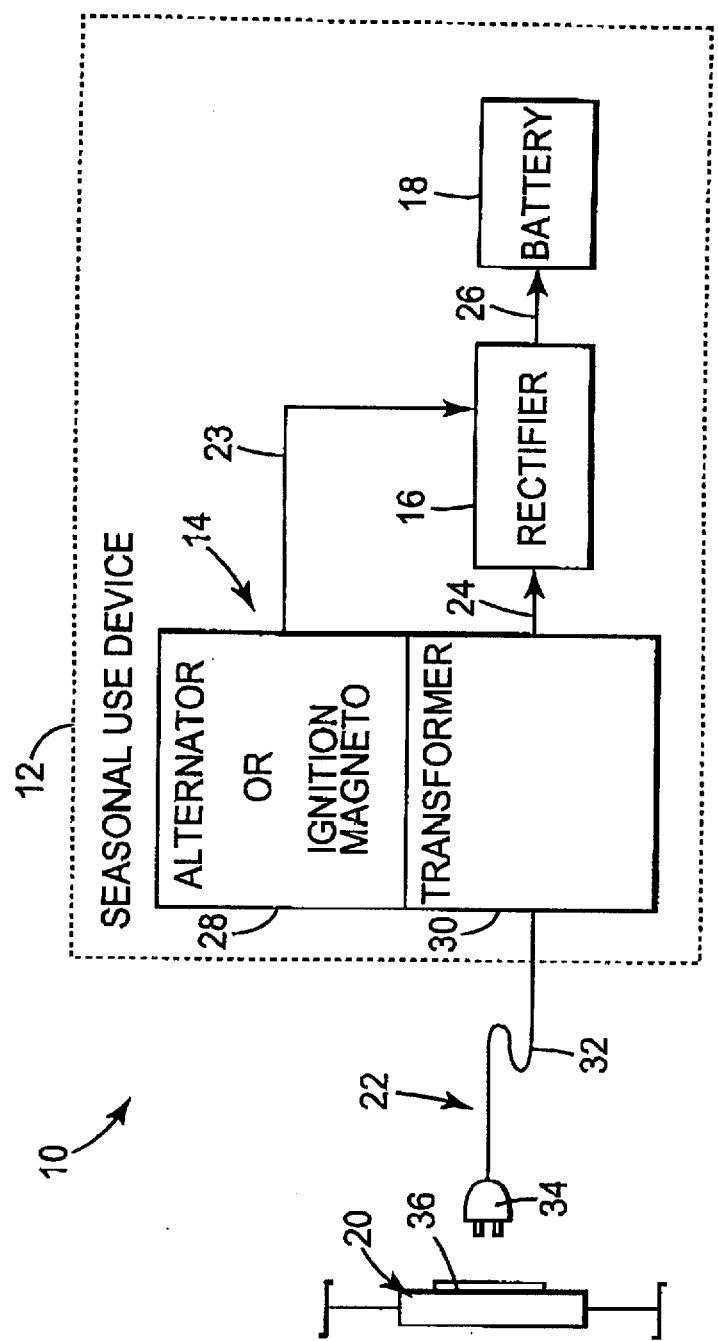
FIG. 2 is another embodiment of a battery life extender system in accordance with the present invention.

FIG. 2 shows one preferred embodiment of the battery life extender apparatus 10. In this embodiment, the voltage generator and step-down device 14 includes a conventional vehicle alternator or ignition magneto 28 coupled to a transformer 30. Further, the vehicle alternator or ignition magneto 28 is coupled to rectifier 16, indicated at 23. For example, a simple charging circuit (such as those found in a lawn and garden tractor) uses a rotating permanent magnet on the ignition magneto for generating a rotating magnetic field to induce a charging current during use of device 12. For more complex charging systems, such as those used in personal watercraft or agricultural tractors, the voltage generator 28 is an alternator or other rotating device having multiple charging coils.

When the device is in use, the voltage generator 28 induces a voltage on a magnetic core (not shown), which produces an AC voltage approximately equal in magnitude to the desired battery voltage. In this embodiment, AC-to-DC converter 16 is a full wave or half wave rectifier. The AC-to-DC converter receives the AC voltage signal from the alternator or ignition magneto 28 and converts it to a DC voltage equivalent to the desired battery voltage and charging current level. In a typical charging circuit, the voltage generator 28 produces approximately 1–3 amp charging current at rated battery voltage to battery 18 at full engine speed.

For use as a battery life extender apparatus 10 during the off season, the conventional charging system is modified to include AC line input capability, indicated by coupling mechanism 22. In the embodiment shown, the coupling mechanism 22 is a standard electrical cord 32 having a grounded plug member 34 for coupling to a 120 volt power source at outlet 36.

To maintain the battery 18 during the off season, transformer 30 is coupled to power source 20 using coupling mechanism 22. Transformer 30 is sized specifically for the individual battery 18. Preferably, transformer 30 provides a maintaining current to battery 18 equal to the battery's self-discharge current. For example, for lead-acid batteries, the desired current has been found to be in the range of 0.4 mA to 1.6 mA per ampere-hour rating of the battery.

Figure 3:
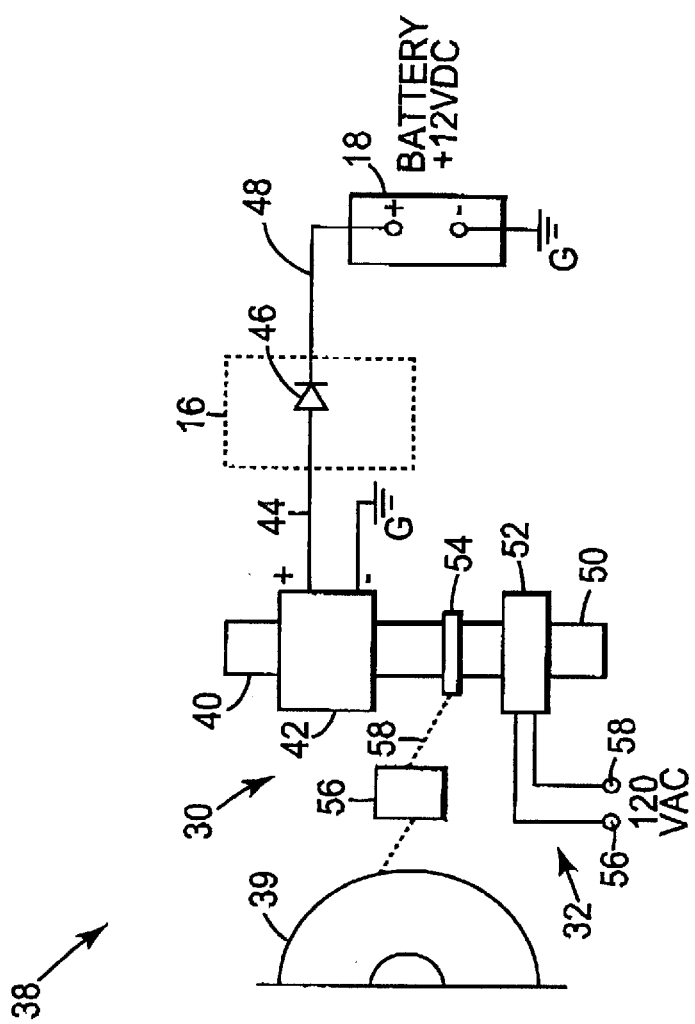
FIG. 3 is a schematic diagram showing one preferred embodiment of the battery life extender system shown in FIG. 2.

Referring to FIG. 3, one method of integrating the battery life extender apparatus 10 into a seasonal-use device's conventional battery charging system is shown at 38. In this embodiment, the seasonal-use device's charging system is a very simple battery charging system which includes a flywheel 39 and a transformer 30 having a transformer core 40 and a secondary winding 42. The transformer secondary winding 42 is coupled to AC-to-DC converter 16, indicated at 44. In the embodiment shown, the AC-to-DC converter 16 is a one-half wave rectifier which includes diode 46. The AC-to-DC converter 16 is coupled to the battery 18, indicated at 48.

An additional transformer core extension 50, having a primary winding 52, is coupled to the transformer core 40 having secondary winding 42 at coupling device 54. Primary winding 52 may be coupled to a standard 120 volt AC outlet, using methods previously described herein, such as a power cord 32, indicated at terminal 56 and terminal 58.

It is recognized that the transformer core extension 50 and the transformer core 40 may be manufactured such that the magnetic cores plug or "fit" together forming a common magnetic path. The turns ratio of primary winding 52 and secondary winding 42 are sized for providing the necessary maintaining current to battery 18. When primary winding 52 is energized by coupling the primary winding 52 to a 120 volt AC source, the secondary winding 42 provides the desired maintenance current to battery 18 approximately equal to the battery's self-discharge rate.

In one embodiment, battery 18 is a 12 volt DC battery, and primary winding 52 is coupled to a conventional 120 volt AC outlet through power cord 32. The turns ratio between primary winding 52 and secondary winding 42 is 9.3 to 1, wherein the primary winding 52 winds 2250 turns about transformer core extension 50, and secondary winding 42 winds 242 turns about transformer core 40. With this embodiment, a maintenance current of 27 milliamps is provided to battery 18 during the off season for a 65 amp hour battery, which is approximately equal to the battery self-discharge rate of about 1 percent per day.

It is also recognized that the battery life extender 10 may include a flywheel interlock 56, mechanically coupled to core coupling device 54, indicated by dashed line 58. When transformer core extension 50 is coupled to transformer core 40, the flywheel interlock 56 operates to lock the seasonal-use device flywheel (indicated at 60) stationary. During the off season, the flywheel safety interlock 56 engages the magnet/flywheel such that the engine may not be started or "turned over" when the battery life extender apparatus 10 is in operation. Additionally, the mechanical interlock 56 may open the circuit to the low current starter solenoid. Further, it is recognized that other mechanical interlock (or electrical) mechanisms may be used.

Figure 4:
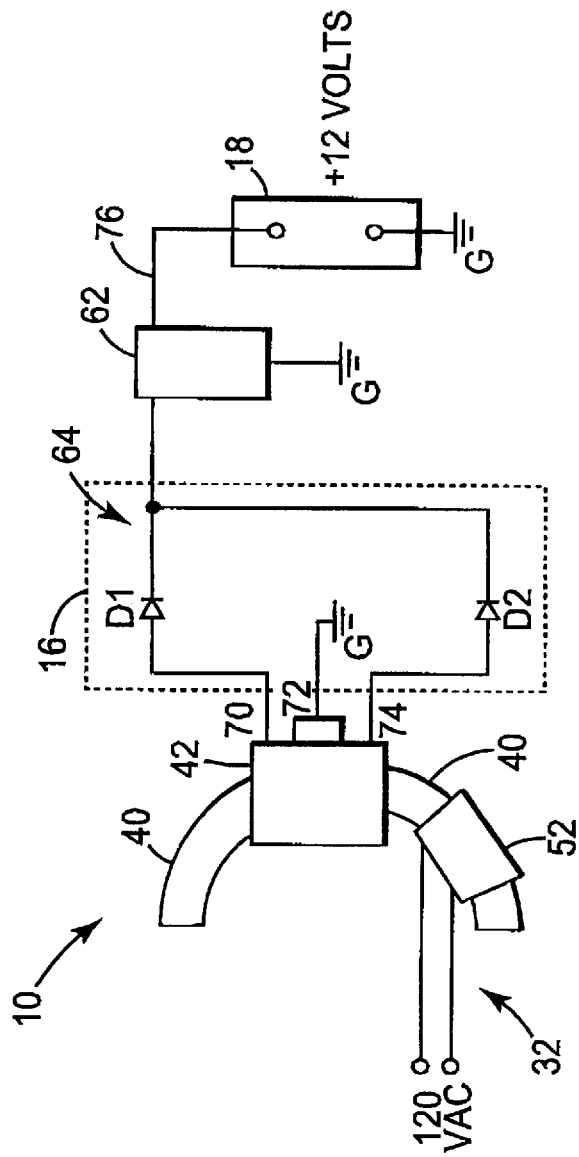
FIG. 4 is a schematic diagram showing another preferred embodiment of the battery life extender system shown in FIG. 2.

Referring to FIG. 4, another embodiment of the present invention is shown where the battery life extender apparatus 10 is integral a seasonal-use device's battery charging system. The primary winding 52 is coupled onto the single use transformer core 40. Extending from and electrically coupled to the primary winding 52 is power cord 32 for coupling to a 120 volt power source. It is recognized that the primary winding 52 may be integrated with the power cord 32 to provide the minimal magnetic coupling necessary to supply the very small maintenance current present on the secondary windings. The primary winding 52 may be simply an interlocking receptacle coupled into the end of the power cord 32, which is plugged into the seasonal-use device at transformer core 40.

In the embodiment shown, the battery life extender 10 further includes AC-to-DC converter 16 and current regulator 62. The AC-to-DC converter 16 includes a full wave rectifier 64 having diode D1 and diode D2. The transformer secondary winding 42 has a voltage divider configuration including output terminal 70, ground 72, and output terminal 74. Negative terminal 72 is coupled to ground G. Diode D1 is coupled between output terminal 70 and current regulator 62. Diode D2 is coupled between output terminal 74 and current regulator 62. Current regulator 62 is coupled between diode D1, D2 and ground G, and is coupled to battery 18, indicated at 76.

AC-to-DC converter 16 allows full wave rectification of the output of transformer secondary winding 42. Current regulator 62 regulates the maintenance current provided to battery 18. It is contemplated that current regulator 62 may include any device used for regulating or minimizing current in an electrical circuit. In one embodiment, current regulator 62 includes a current regulating transistor together with a Zener diode and resistor reference. In another embodiment, current regulator 62 includes a very sophisticated integrated circuit current regulator such as LM7812 by National Semiconductor Corporation of Santa Clara, Calif.

Figure 5:
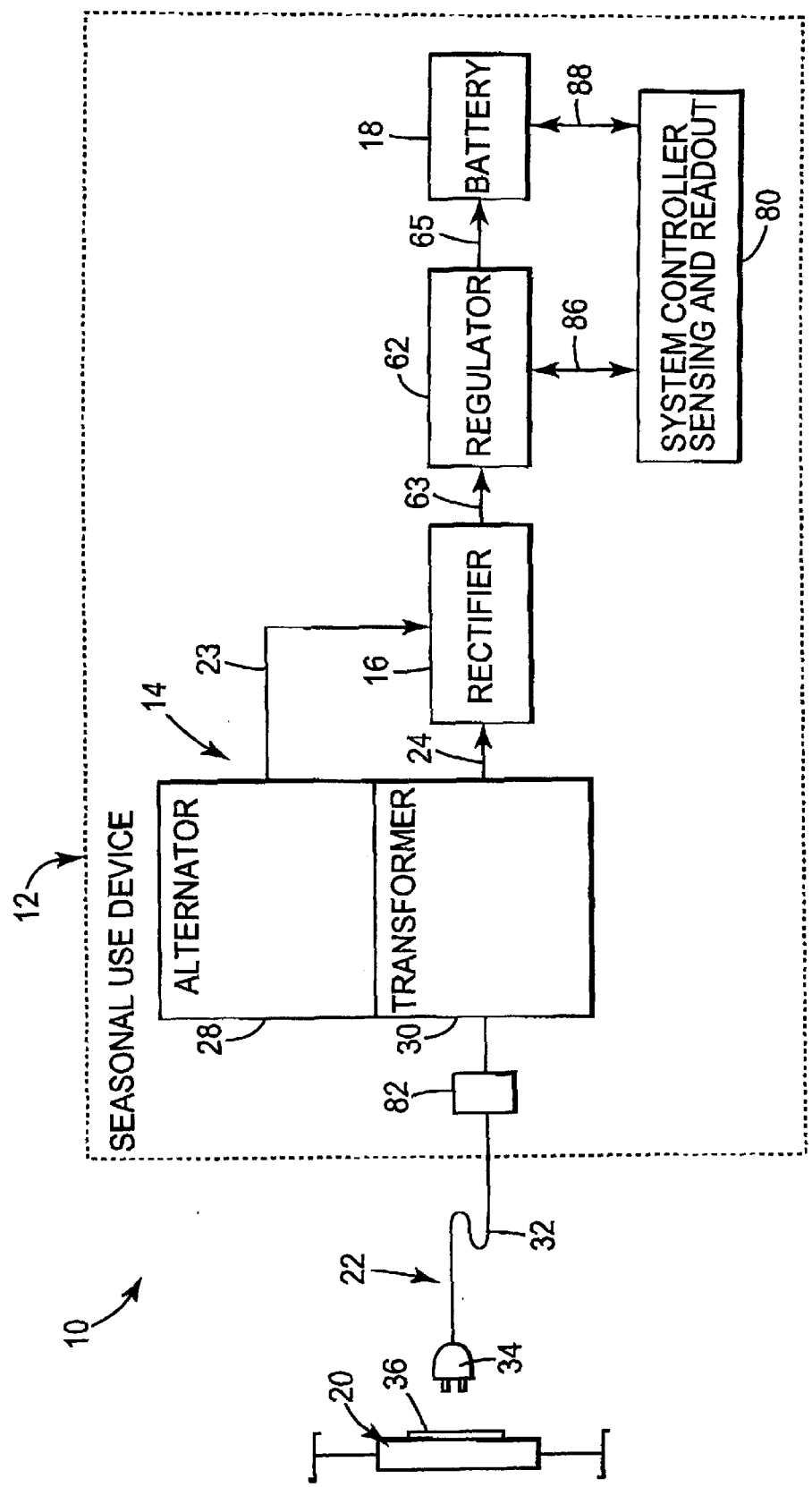
FIG. 5 is another block diagram showing another embodiment of the battery life extender system in accordance with the present invention.

Referring to FIG. 5, another embodiment of the battery life extender apparatus 10 is generally shown, integrated into the charging system of a seasonal-use device 12. In this embodiment, the battery life extender apparatus 10 is integrated into the seasonal-use device's system controller 80. The system controller 80 controls the device's operation, and further provided diagnostic sensing and control of the seasonal-use device battery charging system and battery life extender apparatus 10. It is recognized that system controller 80 may be any type of device capable of performing logical operations, such as a computer, a microprocessor or microcontroller, a sequence of logic gates, or a combination of these.

Safety interlock 82 is mechanically coupled to the output of transformer 30. The safety interlock 82 disables the battery life extender apparatus 10 and provides electrical isolation at the output of transformer 30 when the battery life extender apparatus 10 is not in use. Rectifier 16 is electrically coupled to regulator 62, indicated at 63. Regulator 62 is electrically coupled to battery 18, indicated at 65. System controller 80 is electrically coupled to regulator 62, indicated at 86, for providing sensing and control signals between system controller 80 and regulator 62 (sensing devices not shown). System controller 80 is electrically coupled to battery 18, indicated at 88, for providing sensing and control signals between system controller 80 and regulator 62 (sensing devices not shown).

Figure 6:
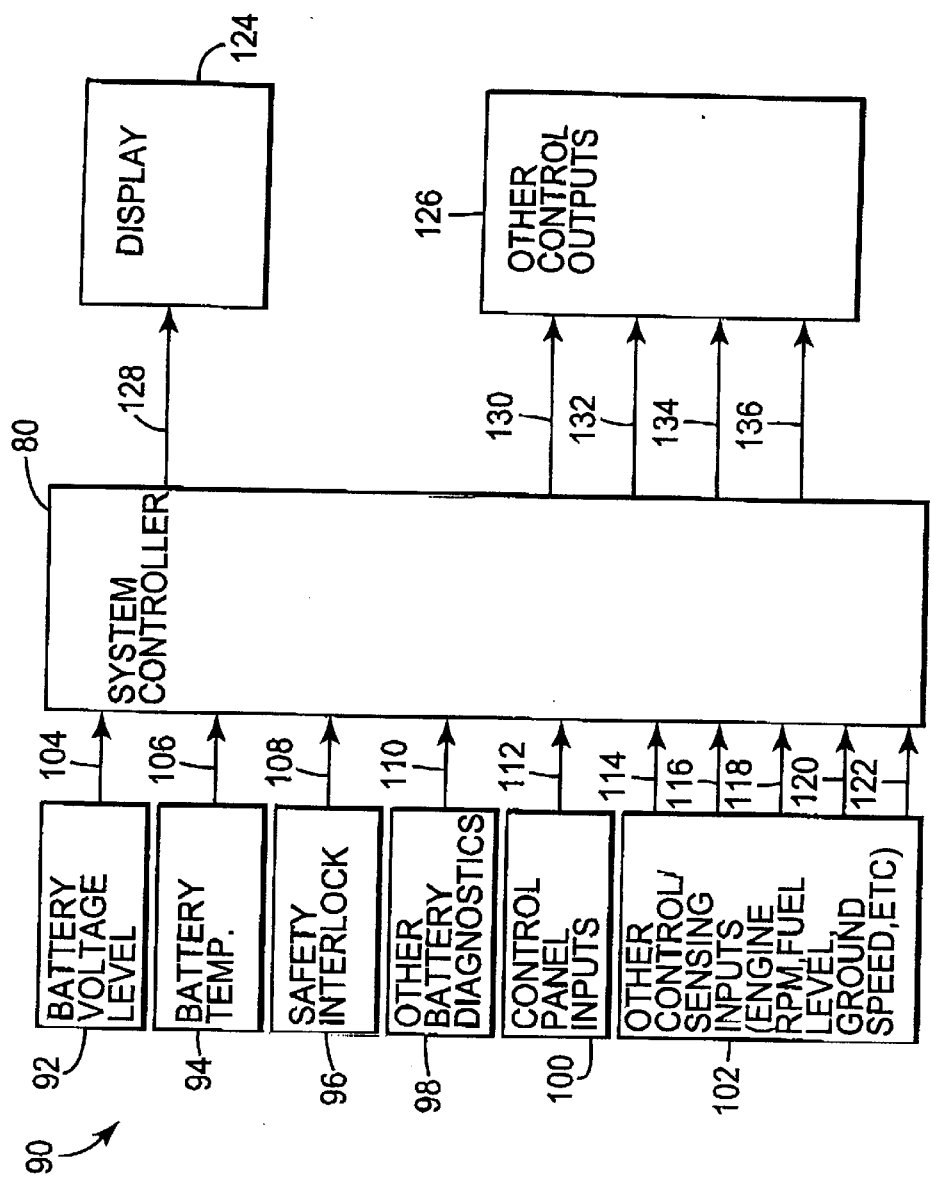
FIG. 6 is a block diagram of one embodiment of the battery life extender system integrated with a seasonal-use device system controller.

Referring to FIG. 6, a block diagram is shown integrating the battery life extender apparatus 10 into a seasonal-use device's system controller 80, is generally shown at 90. The system 90 includes battery voltage level sensor 92, battery temperature sensor 94, safety interlock sensor 96, other battery diagnostic sensors 98, control panel inputs 100, and other control/sensing inputs 102. Battery voltage level sensor 92 is electrically coupled to system controller 80 at input 104. Battery temperature sensor 94 is electrically coupled to system controller 80 at input 106. Safety interlock sensor 96 is electrically coupled to the system controller 80 at input 108. Other battery diagnostic sensors 98 are electrically coupled to system controller 80 at input 110.

The controller panel inputs 100 are electrically coupled to system controller 80 at input 112, and other control/sensing inputs 102 are electrically coupled to system controller 80, indicated by input 114, input 116, input 118, input 120, and input 122. The other control/sensing inputs represent conventional seasonal-use device sensing inputs, such as engine RPM, fuel level, ground speed or water speed, etc.

The system controller 80 provides control outputs to display 124 and other control outputs 126. Display 124 is electrically coupled to system controller 80 at output 128. System controller 80 provides output signals to display 124 based on control panel inputs 100, and other sensor inputs. Similarly, other control outputs 126 is electrically coupled to system controller 80 indicated by output 130, output 132, output 134, and output 136. System controller 80 is responsive to the sensed inputs and provides corresponding other control outputs 126. For example, based on the safety interlock 96 input 108, the system controller 80 may enable or disable the seasonal-use device engine or disconnect power at the primary winding 52.

The battery diagnostics utilize the existing seasonal-use device system controller 80 and corresponding display 124 to display battery diagnostics and to provide outputs to adjust battery charging levels and maintenance current levels. Further, if the seasonal use battery life extender apparatus 10 is powered during the off season, power is maintained to the system controller 80. Since power is maintained to system controller 80, the system controller 80 can monitor battery diagnostics, indicate the battery diagnostics on the display 124, and provide control outputs based on the sensed battery characteristics to regulate the maintenance current to battery 18.

Figure 7:
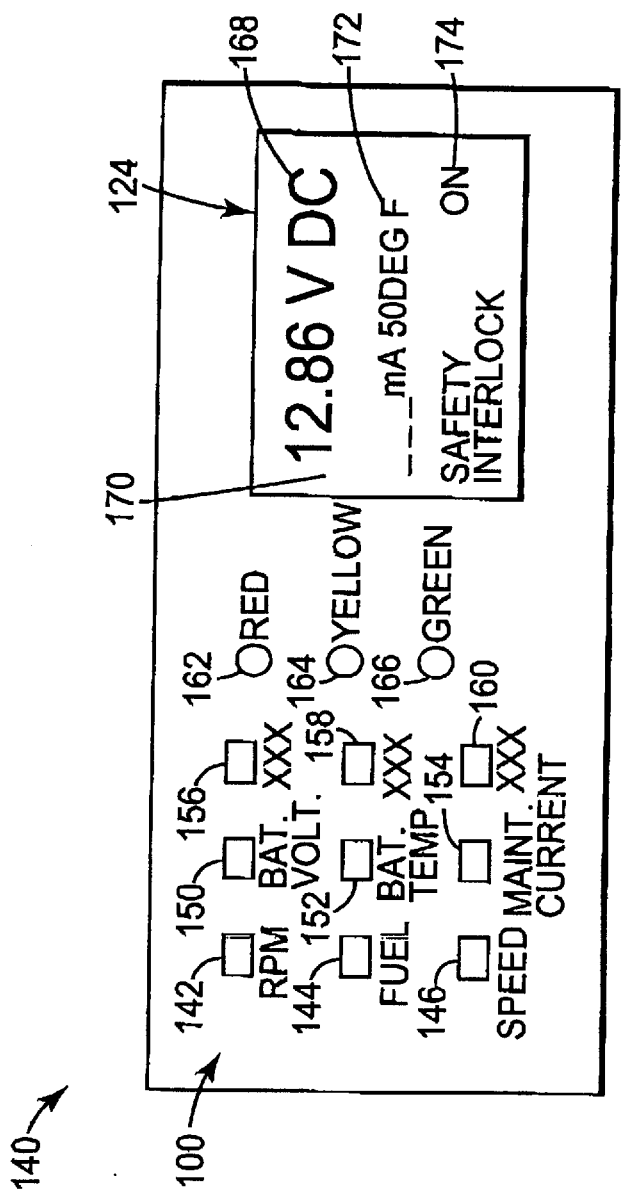
FIG. 7 is a top view of a seasonal-use device control panel.

Referring to FIG. 7, a typical seasonal-use device control panel device (such as for a personal watercraft or other device) is shown generally at 140. The control panel 140 includes the display 124 and the control panel inputs 100. Control panel inputs 100 include display buttons, such as RPM button 142, fuel button 144, speed button 146, battery voltage 150, battery temperature 152, and battery maintenance current 154. The control panel may include other buttons 156, 158 and 160, and may also include indicator lights 162, 164 and 166. Display 124 is responsive to the control panel inputs 100. For example, by pressing battery voltage button 150, the display 124 will display the present battery voltage, such as 12.86 volts DC (168). Similarly, by pressing the maintenance current button 154, the display 124 will display the maintenance current in milliamps (170); by pressing the battery temperature button 152, the display 124 will display the battery temperature (172); or the display 124 may display other important seasonal-use device diagnostics, such as whether the safety interlock is on as indicated at 174.

In operation, the seasonal-use device is merely positioned in a storage area, such as a garage, adjacent a conventional 120 volt power outlet. Referring to the embodiment of FIG. 3, the transformer core extension 50 is coupled to the secondary transformer core 40 using core coupling device 54. Upon coupling the transformer core extension to the transformer core 40, a flywheel interlock 56 locks flywheel 60 in place, such that the seasonal-use device engine may not be started or "turned over" during operation of the battery life extender apparatus 10. Once energized by plugging power cord 32 into the conventional outlet, the battery life extender apparatus 10 provides a maintenance current to battery 18, which is equal to the battery's self-discharge current.

Similarly, referring to FIG. 4, primary winding 52 may be coupled to transformer core 40. By plugging in power cord 32, the battery life extender apparatus 10 is energized, providing the desired maintenance current to battery 18. Further, referring to FIGS. 5, 6 and 7, since during the off-season power is present to maintain the charge on battery 18, system controller 80 and the corresponding display 124 remain operational for controlling and displaying desired diagnostics or battery diagnostics. Further, since system controller 80 is energized, the system controller 80 may adjust battery life extender system outputs 130 based on sensed battery characteristics, such as battery voltage level 92 and battery temperature 94.

It is further recognized that battery characteristics change with the age of the battery. It is recognized that battery diagnostics could sense battery changes, such as battery static voltage and battery cranking voltages, and provide a corresponding readout at display 124. As the battery ages, the difference between the static voltage and battery cranking voltage gets greater and greater. For example, when a 12 volt battery is new, there may be a 3 volt difference between the static voltage and battery cranking voltage, and near the end of the life of the battery, the difference may exceed 5 volts. Once the difference between the battery static voltage and battery cranking voltage exceeds a desired amount, such as 5 volts, the battery maintainer may be programmed to no longer maintain the battery, but alternatively display a "warning" or beep to warn the device operator that the battery is no longer useable.

It will be understood that this disclosure is, in many respects, only illustrative. Changes may be made in details, particularly in matters of shape, size, material and arrangement of parts without exceeding the scope of the invention. Accordingly, the scope of the invention is as defined in the language of the appended claims.

What is claimed is:

1. Apparatus for precluding discharge of any lead acid battery used in an intermittent-use device with an integral battery charging system having various components including means for controlling a direct current, and means for transmitting the direct current to the battery of the device, comprising:

means, employing components of the integral battery charging system of the device, including at least said means for controlling the direct current and means for transmitting the direct current to the battery of the device, for providing a maintenance current to the battery proximate the specific battery's self-discharge rate while the device is not in use; and means for coupling the means for providing a maintenance current to an external power source.

2. The apparatus of claim 1, wherein the means for providing a maintenance current further includes means for transmitting a generated alternating current, and means for converting alternating current to direct current.

3. The apparatus of claim 2, wherein means for transmitting a generated alternating current are coupled to the means for coupling the battery charging system to the external power source.

4. The improvement of claim 3, wherein the means for coupling is a power cord and the external power source is a conventional outlet coupled to a 120 volt power system.

5. In a seasonal-use device having a battery charging system including a voltage step-down device coupled to the charging system, the improvement comprising:

means integral the battery charging system for providing a maintenance current to the battery proximate the battery's self-discharge rate;

means for coupling the battery charging system to an external power source;

a primary transformer core extension, wherein the primary winding is coupled about the primary transformer core extension;

means for coupling the primary transformer core extension to the secondary transformer core;

an interlock mechanism coupled to the means for coupling the transformer core extension for locking;

wherein the voltage step-down device is a transformer having a secondary winding, wherein the means for providing a maintenance current further includes the battery charging system having the transformer secondary winding coupled to a secondary transformer core; and means for providing a maintenance current coupled to the secondary transformer core including a primary winding.

6. A battery life extender apparatus for use in extending the life of a battery located within an intermittent-use device having an integral battery charging system, the battery life extender, comprising:

an intermittent-use device integral battery charging system including:

an integral maintainer mechanism for providing a maintenance current to the battery proximate the battery's self-discharge rate while the intermittent-use device is not in use, the maintainer mechanism including a transformer having a core and a secondary winding coupled to the core, and an AC to DC converter electrically coupled to the transformer, the battery being electrically coupled to the AC to DC converter; and means for coupling the transformer to an external power source for providing a maintenance current to the battery.

7. The apparatus of claim 6, wherein the means for coupling includes:

a primary winding coupled to the transformer core;

a power cord coupled to the primary winding.

8. The apparatus of claim 6, wherein the primary winding is coupled to the transformer core through a transformer core extension.

9. The apparatus of claim 6, wherein the battery is a lead acid battery.

10. The apparatus of claim 6, further comprising:

a system controller;

a battery sensor coupled to the system controller having an output signal representative of a sensed battery diagnostic characteristic.

11. The apparatus of claim 10, further comprising a system display coupled to the system controller.

12. Apparatus for precluding discharge of a battery used in an intermittent-use device during non-use of the device, the device including an integral battery charging system having at least one charging component, the apparatus comprising:

means for sharing said at least one charging component of the device including means for providing a maintenance current to the battery proximate the battery's discharge rate while the device is not in use; and means for coupling the means for providing a maintenance current to an external power source.

13. The improvement of claim 12, wherein said sharing means includes means for transmitting a direct current to the battery of the device.

14. The improvement of claim 13, wherein said sharing means includes means for controlling said direct current.

15. The improvement of claim 12, wherein said sharing means includes means for converting an alternating current to a direct current.

16. The improvement of claim 12, wherein said sharing means includes means for transmitting a generated alternating current.

17. Apparatus for precluding discharge of a lead acid battery used in an intermittent-use device with an integral battery charging system having various components including means for controlling a direct current, and means for transmitting the direct current to the battery of the device, comprising:

means, employing components of the integral battery charging system of the device, including at least said means for controlling the direct current and means for transmitting the direct current to the battery of the device, for providing a maintenance current to the battery proximate the specific battery's discharge rate while the device is not in use; and means for coupling the means for providing a maintenance current to an external power source.

18. Apparatus for precluding discharge of a battery used in an intermittent-use device, the apparatus comprising:

means for providing a maintenance current to the battery proximate the specific battery's discharge rate while the device is not in use, including a non-voltage regulated power supply having a direct current output, and means for transmitting the direct current to the battery; and means for coupling the means for providing a maintenance current to an external power source.

* * * * *

UNITED STATES PATENT AND TRADEMARK OFFICE
CERTIFICATE OF CORRECTION

PATENT NO. : 5,864,223
DATED : January 26, 1999
INVENTOR(S) : Dennis R. Meyer

It is certified that error appears in the above-identified patent and that said Letters Patent is hereby corrected as shown below:

On the title page, Item [56], under Attorney, Agent, or Firm, please delete:

"Dicke, Billig & Czafa, P.A." and insert

--Dicke, Billig & Czaja, P.A.-- therefor

Signed and Sealed this

Third Day of August, 1999

Attest:

Attesting Officer

Q. TODD DICKINSON

Acting Commissioner of Patents and Trademarks